(12) United States Patent
Elpern et al.

(10) Patent No.: US 7,502,717 B2
(45) Date of Patent: Mar. 10, 2009

(54) METHOD FOR PREDICTING AIR CYCLE MACHINE TURBINE ICE FORMATION AND SHEDDING AND JOURNAL BEARING WEAR

(75) Inventors: David G. Elpern, Los Angeles, CA (US); Sunil K. Menon, Golden Valley, MN (US); Alex Morando, Rowland Heights, CA (US); Girija Parthasarathy, Maple Grove, MN (US); Jon E. Schryver, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 386 days.

(21) Appl. No.: 11/406,565

(22) Filed: Apr. 18, 2006

(65) Prior Publication Data

US 2007/0240435 A1  Oct. 18, 2007

(51) Int. Cl.
*G06F 17/00* (2006.01)
*G06F 17/40* (2006.01)

(52) U.S. Cl. ............................. 702/183; 702/34; 701/14
(58) Field of Classification Search ................. 702/183, 702/34
See application file for complete search history.

(56) References Cited

U.S. PATENT DOCUMENTS

| | | | |
|---|---|---|---|
| 3,596,263 A | 7/1971 | Ciemochowski | |
| 4,379,227 A | 4/1983 | Kovacs | |
| 5,005,015 A | 4/1991 | Dehn et al. | |
| 5,086,622 A | 2/1992 | Warner | |
| 5,113,670 A | 5/1992 | McAuliffe et al. | |
| 5,224,842 A | 7/1993 | Dziorny et al. | |
| 5,541,733 A | 7/1996 | Gagnon | |
| 5,644,080 A | 7/1997 | Stormbom et al. | |
| 6,237,874 B1 * | 5/2001 | Rutherford et al. | 244/134 E |
| 6,279,856 B1 * | 8/2001 | Rutherford et al. | 244/134 E |
| 6,381,969 B1 | 5/2002 | Afeiche et al. | |
| 6,779,332 B2 | 8/2004 | Horii et al. | |
| 6,786,033 B2 | 9/2004 | Simunek | |
| 6,868,721 B2 | 3/2005 | Szilder | |
| 7,246,480 B2 * | 7/2007 | Ritland | 60/39.093 |
| 2006/0059942 A1 * | 3/2006 | McAuliffe et al. | 62/402 |

* cited by examiner

*Primary Examiner*—Hal D Wachsman
(74) *Attorney, Agent, or Firm*—Ingrassia Fisher & Lorenz, P.C.

(57) ABSTRACT

Methods and apparatus are provided for predicting ice formation on and shedding from blades of an air cycle machine ("ACM") turbine. The method comprises generating operational condition data representative of ACM turbine operating conditions using a software model of the ACM, determining an amount of ice formation on the blades of the ACM turbine, and determining an amount of ice shed from the blades of the ACM turbine. The apparatus comprises means for generating operational condition data representative of ACM turbine operating conditions using a software model of the ACM, means for determining an amount of ice formation on the blades of the ACM turbine, and means for determining an amount of ice shed from the blades of the ACM turbine. In some embodiments, the means and apparatus may also involve predicting ACM wear, based at least in part on the predicted ice formation and shedding.

20 Claims, 9 Drawing Sheets

METHOD FOR PREDICTING AIR CYCLE MACHINE TURBINE ICE FORMATION AND SHEDDING AND JOURNAL BEARING WEAR

TECHNICAL FIELD

The present invention generally relates to prognostic health monitoring of an air cycle machine (ACM) for an aircraft, and more particularly relates to predicting ice formation and shedding on ACM turbine blades, and resulting wear on ACM journal bearings.

BACKGROUND

Air cycle machines (ACM) are used in many aircraft environmental control systems (ECS). The ECS, as is generally known, is used to manage cooling, heating, and pressurization of the aircraft. The ACM typically takes the form of a compact, rotary compressor based system, and may include a compressor, a heat exchanger, a fan, a turbine with blades and bearings, such as journal bearings, and a shaft connecting the compressor, fan and turbine. The ACM compressor receives compressed ambient air from an engine compressor or auxiliary power unit, further compresses the air, and supplies the further compressed air to the ACM turbine. The further compressed air expands through the ACM turbine, providing power as well as a cool, fresh air supply for the aircraft.

ACMs, like many apparatus, are susceptible to wear, and are a relatively expensive ECS part to repair and overhaul. One source of wear for ACMs results from ice formation and shedding on ACM turbine blades. This ice formation and shedding on the ACM turbine blades can result in imbalance conditions for the ACM turbine blades, causing wear to ACM journal bearings. The ice formation and shedding, and resulting ACM bearing wear, is difficult to accurately predict due to dynamic conditions in the ACM, and such ACM wear is generally not detected until after the wear has become significant enough so as to have noticeable deleterious effects on the ACM. Once these noticeable deleterious effects have occurred, the ACM can become much more expensive to repair.

Accordingly, there is a need for a method and apparatus to accurately predict ice formation and shedding, and resulting ACM wear, under dynamic conditions associated with an ACM.

BRIEF SUMMARY OF THE INVENTION

A method is provided for predicting ice formation on and shedding from blades of an air cycle machine ("ACM") turbine. The method comprises generating operational condition data representative of ACM turbine operating conditions using a software model of the ACM. An amount of ice formation on the blades of the ACM turbine is determined, based at least in part on the generated operational condition data. An amount of ice shed from the blades of the ACM turbine is determined, based at least in part on the determined amount of ice formation and the generated operational condition data. In one embodiment, the determined amount of ice formation and ice shed is used to predict an amount of wear for the ACM.

An apparatus is also provided for predicting ice formation on and shedding from blades of an ACM turbine. The apparatus comprises means for generating operational condition data representative of ACM turbine operating conditions using a software model of the ACM, means for determining an amount of ice formation on the blades of the ACM turbine, based at least in part on the generated operational condition data, and means for determining an amount of ice shed from the blades of the ACM turbine, based at least in part on the determined amount of ice formation and the generated operational condition data. In one embodiment, the apparatus may also comprise means for determining an amount of wear for the ACM, based at least in part on the amount of ice formation and shed.

BRIEF DESCRIPTION OF THE DRAWINGS

The present invention will hereinafter be described in conjunction with the following drawing figures, wherein like numerals denote like elements, and FIG. 1 provides a schematic depiction of an air cycle machine (ACM).

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
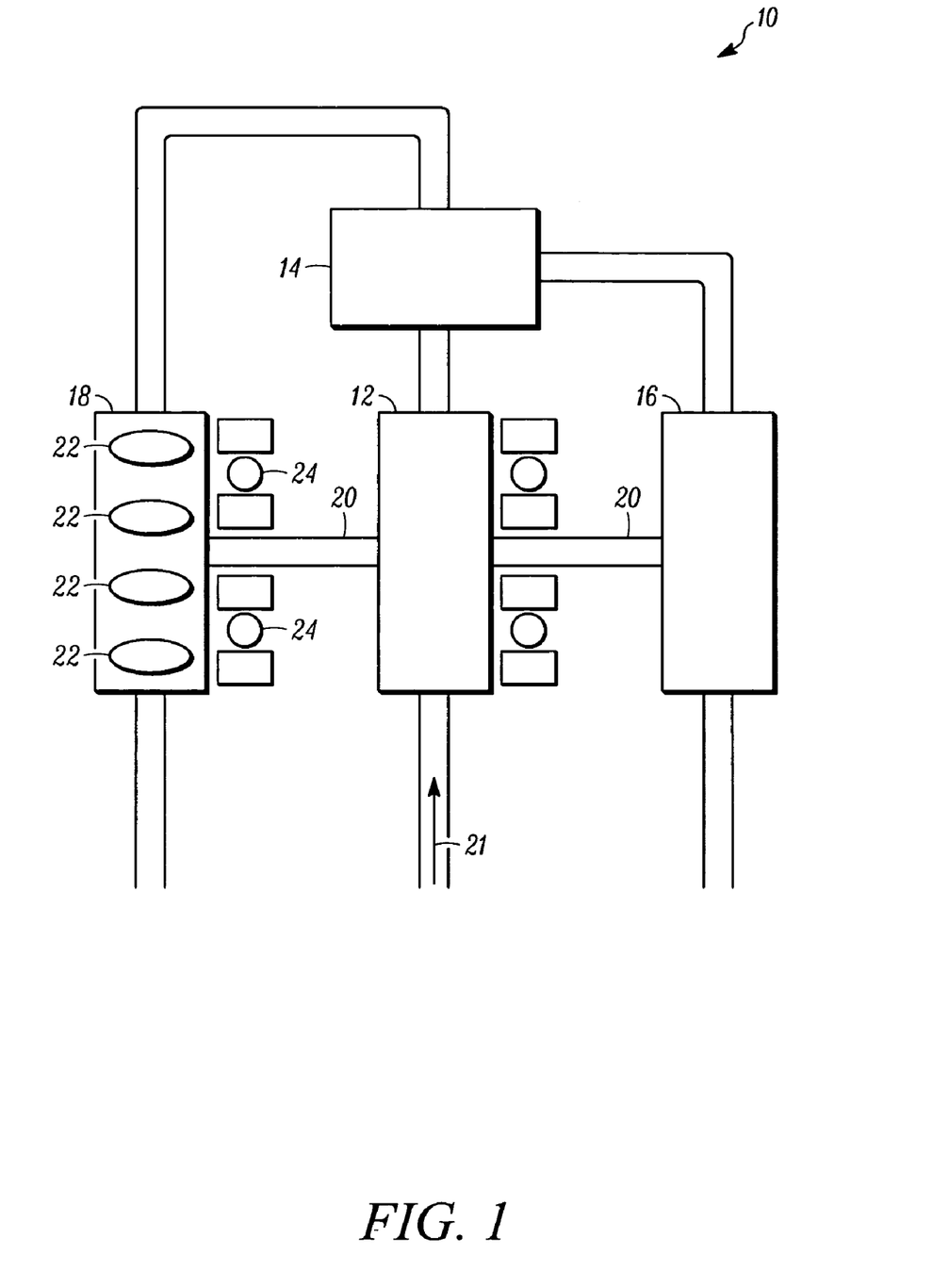

FIG. 1 provides a schematic depiction of an air cycle machine (ACM) 10. In the depicted embodiment, the ACM 10 includes a compressor 12, a heat exchanger 14, a fan 16, a turbine 18, and a shaft 20 that connects the compressor 12, the fan 16, and the turbine 18. During ACM 10 operation, the compressor 12 receives a flow of air 21 from an engine compressor or auxiliary power unit (not shown) and further compresses the air 21, thereby further heating the compressed air 21. The air 21 is then delivered to the heat exchanger 14, where the air 21 is cooled by the fan 16 by drawing cooler air through a portion of the heat exchanger 16. The air 21 is then delivered to the turbine 18, which expands the air 21. As the air 21 expands across turbine blades 22 in the turbine 18, the turbine 18 generates power to drive the compressor 12 and the fan 16, and additionally cools the air 21. The cooled air 21 is then used to cool and condition the aircraft cabin (not shown). The turbine 18 is rotationally mounted via a plurality of bearings, such as journal bearings 24.

Figure 2:
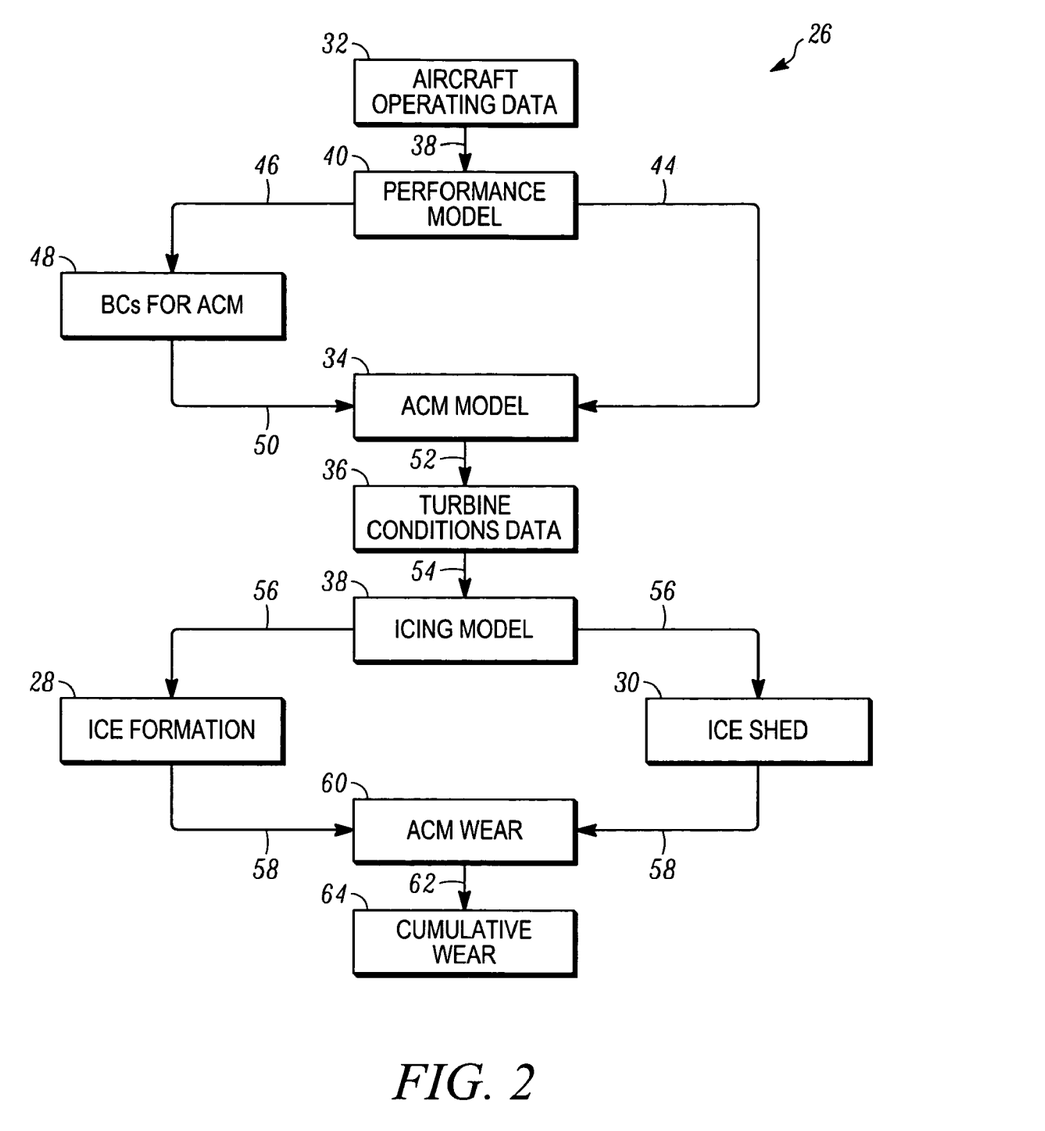
FIG. 2 provides a method of prediction ice formation and shed on ACM turbine blades in a preferred embodiment.

Moving now to FIG. 2, a flowchart is depicted of an icing prediction process 26 for predicting an amount of ice formation 28 and ice shed 30 on the blades 22 of the ACM turbine 18. In the depicted embodiment the process 26 begins by obtaining aircraft operating data 32. The aircraft operating data 32 represents certain operating conditions of an aircraft such as, for example, air temperature, humidity, and altitude, and can be obtained from sensors aboard an aircraft. However, it will be appreciated by one of skill in the art that various other aircraft operating data 32 may be used, and that the aircraft operating data 32 may be generated by any one of numerous types of sensors or other apparatus or systems. Regardless of its specific makeup and how it is obtained, the operating data 32 is supplied to an ACM model 34, which generates turbine conditions data 36 representing operational conditions of the ACM turbine 18. The turbine conditions data 36 are in turn supplied to an icing model 38, which determines the amount of ice formation 28 and ice shed 30 on turbine blades 22. Each of the steps in this generalized process is described in greater detail below.

As depicted in FIG. 2, the aircraft operating data 32 can first be supplied to a performance model 40 in step 38, and to the ACM model 34 in step 44. In step 46 the performance model 40 can be used to determine boundary conditions 48 for the ACM 10, which can be determined at least in part utilizing the aircraft operating data 32 supplied to the performance model 40 in step 38. Next, in step 50, the boundary conditions 48 can be supplied to the ACM model 34. In certain preferred embodiments the performance model 40 can include an aircraft engine performance model and/or an auxiliary power unit performance model; however, it will be appreciated that any number of particular performance models 40 can be used to derive boundary conditions for the ACM 10. It will be appreciated that various steps in the icing prediction process 26, including for example steps 44 and 50, among other steps, need not occur in the same order in which the steps are numbered or otherwise referenced herein.

In step 52, the ACM model 34 preferably uses the aircraft operating data 32 and the boundary conditions 48 to generate the turbine conditions data 36. The turbine conditions data 36 represents operational conditions of the ACM turbine 18 such as, for example, temperature, pressure, and entrained moisture of air for the turbine 18. It will be appreciated that the turbine conditions data 36 may represent various other conditions that may also have an effect on the amount of ice formation 28 and ice shed 30. Preferably the ACM model 34 is a software-based model which uses the boundary conditions 48 to more accurately model the relationship between the aircraft operating data 32 and the turbine conditions data 36. However, it will be appreciated that the ACM model 34 and the performance model 40 can take any one of numerous different forms, and that in certain embodiments the ACM model 34 may not use a performance model 40 and/or boundary conditions 48. Regardless of the type of the ACM model 34 and/or performance model 40 used, the generated turbine conditions data 36 are used by the icing model 38 to determine the amount of ice formation 28 on and ice shed 30 from the ACM turbine blades 22.

Specifically, in step 54 the turbine conditions data 36 are supplied to the icing model 38. Next, in step 56, the amount of ice formation 28 and ice shed 30 are determined using the icing model 38, as set forth in greater detail below and in FIG. 3. Next, in step 58 of a preferred embodiment, an amount of ACM wear 60 can be determined based at least in part on the amount of ice formation 28 and ice shed 30. In a preferred embodiment, the amount of ACM wear 60 can be determined based at least in part on wear to the ACM journal bearings 24, which can be caused by imbalance conditions that can result from ice formation on and shedding from the ACM turbine blades 22. Finally, in step 62 of a preferred embodiment, the determined ACM wear 60 values can be aggregated over a predetermined period of time, in order to determine an amount of cumulative wear 64 for the ACM 10. One particular embodiment for determining the amount of cumulative wear 64 is discussed later in connection with FIG. 13, However, it will be appreciated that various measures of ACM wear 60 may be used, and the amount of cumulative wear 64 may be determined in any one of a number of different manners.

Figure 3:
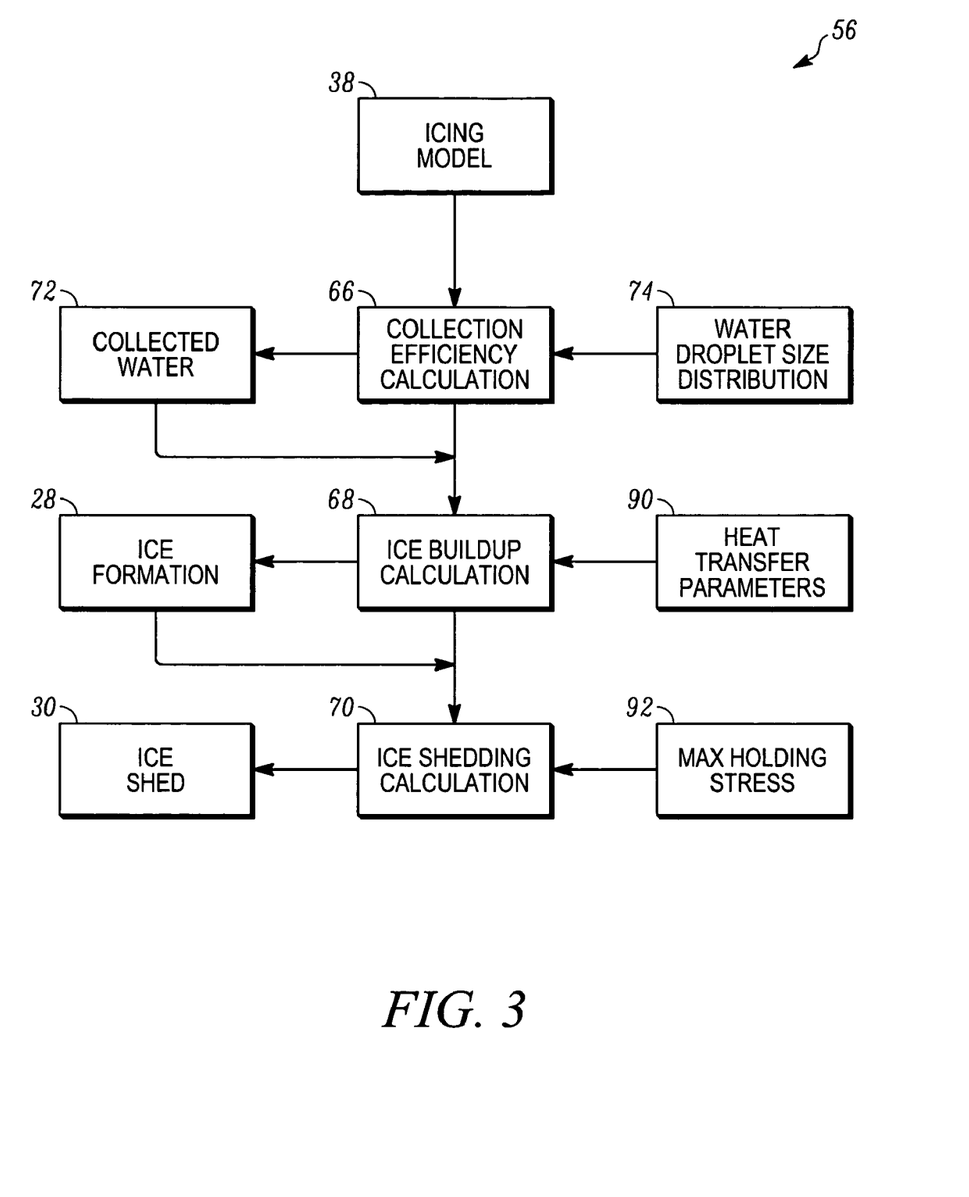
FIG. 3 depicts a flowchart with a more detailed depiction of a step 56 of the method of FIG. 2 in a preferred embodiment.

Turning now to FIG. 3, a more detailed depiction of step 56 for a preferred embodiment is provided, showing intermediate steps 66, 68 and 70 in determining the amount of ice formation 28 and ice shed 30. First, in step 66, the icing model 38 calculates an amount of collected water 72 on the turbine blades 22, based at least in part on the turbine conditions data 36 and typical water droplet size distribution information 74 from the icing model 38.

Figure 4:
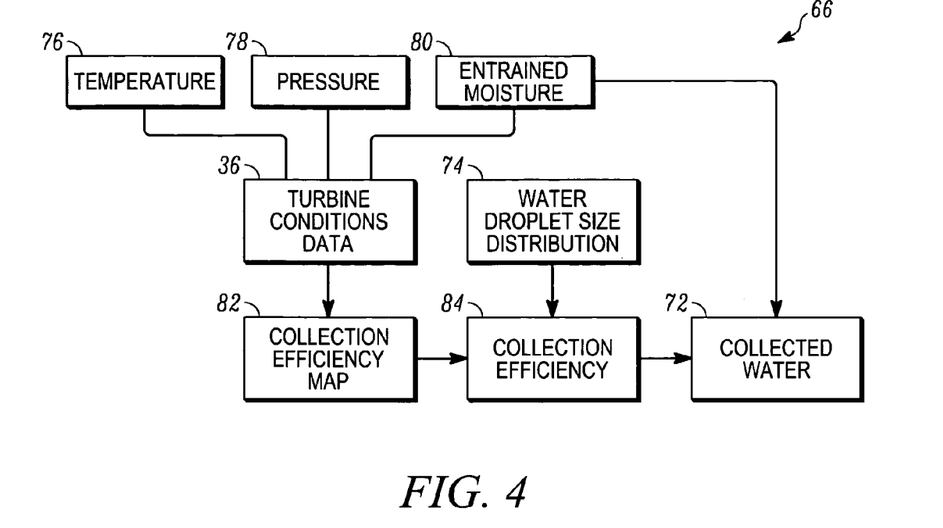
FIG. 4 depicts a flowchart with a more detailed depiction of intermediate step 66 from step 56 of FIG. 3 in a preferred embodiment.
Figure 5:
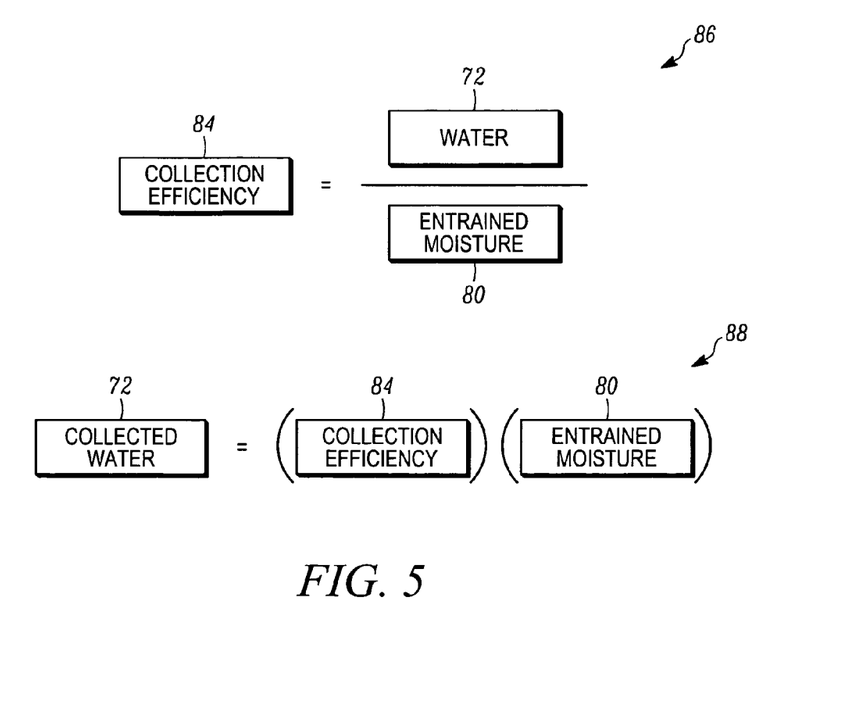
FIG. 5 depicts two formulas pertaining to collection efficiency calculations from FIGS. 4 and 5 in a preferred embodiment.

The method by which the icing model 38 calculates the amount of water collected on turbine blades in step 66 is depicted in greater detail in FIG. 4. As shown therein, collection efficiency calculations are performed using the turbine conditions data 36 supplied in step 54, which preferably includes values for turbine temperature 76, pressure 78 and entrained moisture 80 of air surrounding the ACM turbine 18. As will be discussed later in connection with FIG. 7, these values can further be divided, for example, by using different temperature 76 values for different regions of the turbine 18. The turbine conditions data 36 are used to compute collection efficiency, using a collection efficiency map 82, which models collection efficiency 84 versus water droplet size. As is commonly known, and as set forth in formula 86 of FIG. 5, the collection efficiency 84 represents a ratio of the amount of the collected water 72 on a surface to the amount of entrained moisture 80 in surrounding air. As depicted in FIGS. 4 and 5, when combined with the typical water droplet size distribution information 74 that is supplied from the icing model 38, the collection efficiency map 82 can be used to calculate values of the collection efficiency 84 for the ACM turbine 18. The collection efficiency 84 values can then be combined with the values for the amount of entrained moisture 80 from the turbine conditions data 36 to calculate the amount of collected water 72 for the turbine blades 22. This is done, for example, by multiplying the values for the collection efficiency 84 by the values for the entrained moisture 80 as shown in formula 88 of FIG. 5. In a preferred embodiment, the collected water calculations of step 66 may be based on an assumption that entrained moisture in air surrounding the ACM turbine blades 22 is the only source of water and ice formation on the ACM turbine blades 22.

While FIGS. 4 and 5 depict a preferred embodiment for calculating collected water, it will be appreciated that these calculations can take any one of numerous different forms. For example, the turbine conditions data 36 may include other values instead of, or in addition to, temperature 76, pressure 78, and entrained moisture 80. It will be further appreciated that the droplet size distribution 74 values may be included at the time the icing model 38 is formed, or may be subsequently added and/or updated to the icing model 38. Similarly, it will be appreciated that the assumptions underlying the collected water calculations may vary, resulting in somewhat different calculations which may include, by way of example, calculations pertaining to other sources of water and ice formation. Regardless of the specific variables, steps and assumptions used in the collected water calculations, the amount of collected water 72 is calculated in step 66, for use in calculating the amount of ice formation 28 in step 68.

Next, and returning now to FIG. 3, in step 68 the icing model 38 calculates the amount of ice formation 28 on the turbine blades 22, preferably based at least in part on the amount of collected water 72 calculated in step 66, and heat transfer parameters 90 from the icing model 38 representing heat transfer arising at least in part from air flow through the turbine 18. As is commonly known, ice formation can occur, for example, when the collected or deposited water 72 freezes and accumulates on the ACM turbine blades 22. In a preferred embodiment, the calculations in step 68 are based in part on assumptions that (i) the ACM turbine 18 represents a lumped heat capacity system and (ii) ice formation occurs uniformly over the turbine blades 22. Based on these assumptions, the heat transfer parameters 90 are used, in connection with the calculated values for the collected water 72 on the ACM turbine blades 22 and the turbine conditions data 36, to calculate the amount of ice formation 28 on the ACM turbine blades 22.

It will be appreciated that the assumptions underlying the step 68 calculations may vary, resulting in somewhat different calculations which may include, by way of example, calculations pertaining to non-uniform ice formation. It will also be appreciated that various values of the turbine conditions data 36 may also be used in step 68 in combination with the calculated amount of collected water 72 from step 66 and the heat transfer parameters 90, and that the heat transfer parameters 90 may be included at the time the icing model 38 is formed, or may be subsequently added and/or updated to the icing model 38. Regardless of the specific values, assumptions and information used, and when the heat transfer parameters 90 are supplied to the icing model 38, the amount of ice formation 28 is calculated in step 68, for use in calculating the amount of ice shed 30 in step 70.

Next, in step 70, the icing model 38 calculates the amount of ice shed 30 for the ACM turbine blades 22, preferably based at least in part on the amount of ice formation 28 calculated in step 68, and values for maximum holding stress 92 of the ACM turbine blades 22. As is commonly known, ice shedding can occur, for example, when ice formed on the turbine blades 22 is subjected to centrifugal force that exceeds a holding force of the ice on the blades 22. In a preferred embodiment, the calculations in step 70 are performed by balancing the holding force with the centrifugal force, to determine the amount of ice shed 30. In one such preferred embodiment, the centrifugal force is determined at a midpoint radius of the turbine blade 22, while the corresponding amount of holding force is determined by the maximum holding stress 92 values of the ACM turbine blades 22 from the icing model 38.

It will be appreciated that the assumptions underlying the step 70 calculations may vary, resulting in somewhat different calculations. It will also be appreciated that various values of the turbine conditions data 36 may also be used in step 70 in combination with the calculated amount of ice formation 28 and the maximum holding stress 92 values, and that the maximum holding stress 92 values may be included at the time the icing model 38 is formed, or may be subsequently added and/or updated to the icing model 38.

Figure 6:
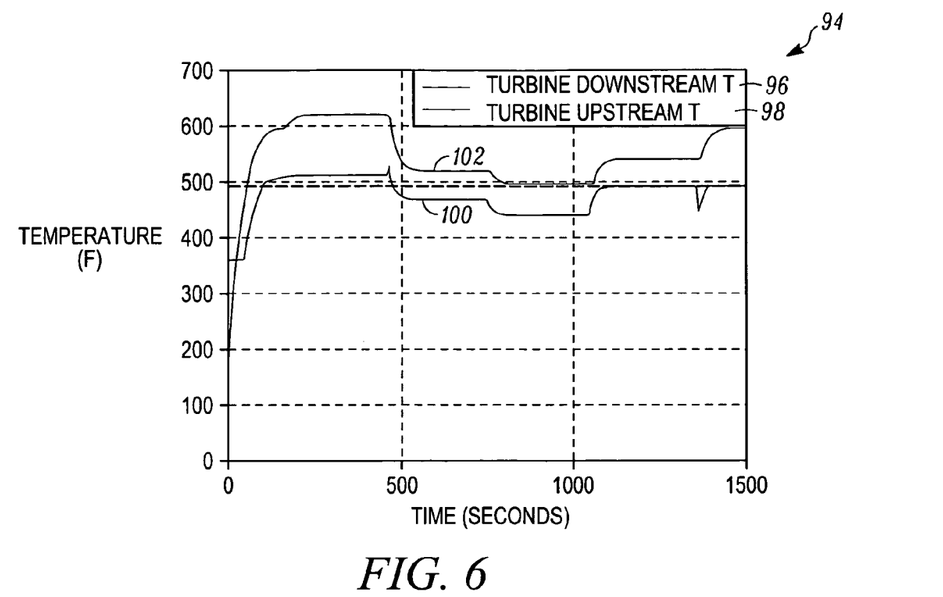
FIG. 6 depicts an illustrative graph for an application of the method of FIG. 2, namely a turbine gas path temperature graph.
Figure 7:
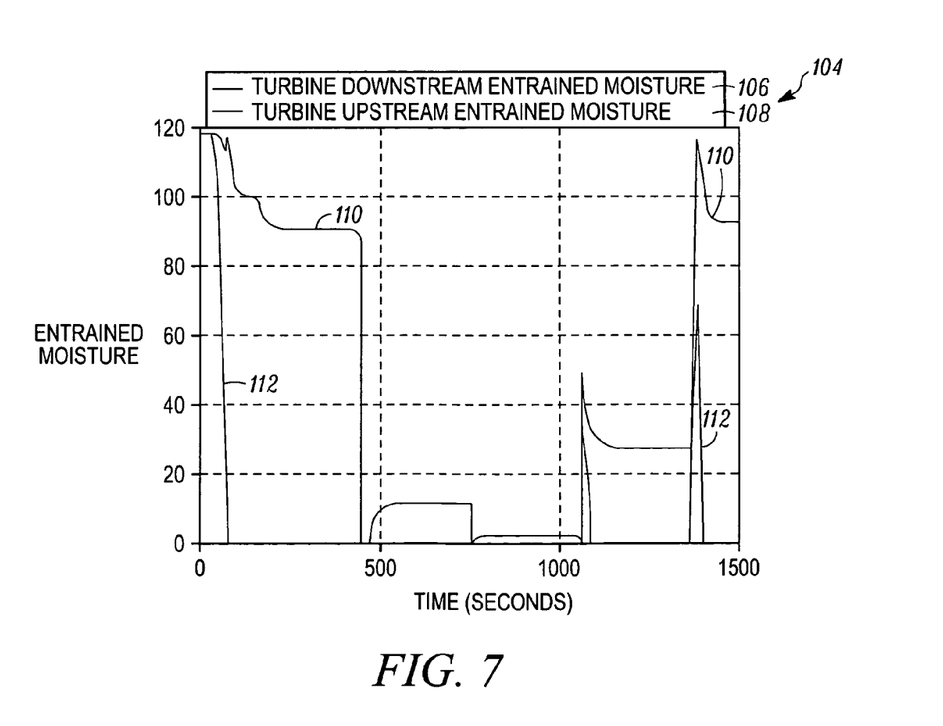
FIG. 7 depicts an illustrative graph for an application of the method of FIG. 2, namely a turbine entrained moisture graph.

As mentioned above, step 56, including intermediate steps 66, 68 and 70, can be conducted with any number of turbine conditions data 36. For example, the turbine temperature 76 values can be separated into turbine downstream temperature 96 and turbine upstream temperature 98 values as shown in FIG. 6 below, and the entrained moisture 80 values can be used to calculate separate turbine downstream entrained moisture 106 and upstream entrained moisture 108 values as shown in FIG. 7. Moreover, the results of the icing prediction process 26 can be used to calculate other icing values that are useful in graphical representation and analysis of the data, such as an amount of ice mass 116 remaining on the turbine blades 22, a frequency of ice shedding 118, and a maximum amount of ice 132 before shedding, as depicted in and discussed in connection with FIGS. 8, 10-12 below. In addition, various techniques can be used, such as a first order lag model depicted in FIGS. 9-12 below, to represent dynamic conditions for the ACM 10 that can cause time delay effects among one or more of the variables. These variations are discussed later in connection with the illustrative examples of graphical applications of the icing prediction process 16, provided in FIGS. 6-12.

Regardless of the specific values, assumptions, techniques and information used in step 56, the data obtained from the icing prediction process 26, including the amount of ice formation 28 and ice shed 30, can be subsequently used in determining various other icing characteristics, as well as the ACM wear 60. For example, the icing prediction process 26 can be used, either onboard an aircraft or remotely, to calculate and monitor the amount of ice formation 28 and ice shed 30 for the ACM turbine blades 22 under dynamic conditions. This enables the calculation and monitoring of the amount of ACM wear 60 which, as mentioned above, can occur on the ACM journal bearings 24 as a result of the ice formation 28 and the ice shed 30 on the turbine blades 22. The icing prediction process 26 can also be used to predict future ACM wear 60 based at least in part on information regarding flight patterns and history, and/or weather conditions or forecasts.

Also as mentioned above, the amount of ice formation 28, ice shed 30, and ACM wear 60 can be monitored using the icing prediction process 26 over an extended period of time for calculating and monitoring the cumulative wear 64 for the ACM 10. This allows the ACM 10 to be replaced or repaired prior to experiencing noticeable deleterious effects, thereby enhancing ACM 10 performance and significantly reducing costs of replacing and/or repairing the ACM 10. In addition, the icing prediction process 26 can also reduce costs in situations where the ACM 10 has not experienced substantial wear over a period of time, so that the ACM 10 need not be prematurely repaired or replaced.

As mentioned above, FIGS. 6-12 depict illustrative graphical examples for a particular empirical application involving the icing prediction process 26. As will be appreciated, the icing prediction process 26 can be used in any one of numerous different applications, and these examples are for illustrative purposes only.

First, FIG. 6 depicts a turbine gas path temperature graph 94, which is a graph of the turbine temperature 76 of the turbine 18 gas path, versus flight time. The turbine temperature 76 is preferably one of the turbine conditions data 36, which is preferably determined at least in part by the ACM model 34 using the aircraft operating data 32, and most preferably also using boundary conditions 48 calculated by the performance model 40. As shown in FIG. 6, the turbine temperature 76 values can be separated into separate values, for example through separate measurements and/or calculations, for turbine downstream temperature 96 and turbine upstream temperature 98, among various other potential categories and sub-categories of the turbine conditions data 36. FIG. 6 shows the turbine downstream temperature 96 values on curve 100, and the turbine upstream temperature 98 values on curve 102.

FIG. 7 depicts a turbine entrained moisture graph 104, which is a graph of the entrained moisture 80 versus flight time. The entrained moisture 80 is preferably calculated in the intermediate step 66 of step 56 of the icing prediction process 26. As shown in FIG. 7, the entrained moisture 80 values can be separated into separate values for turbine downstream entrained moisture 106 and turbine upstream entrained moisture 108, for example through separate measurements and/or calculations based at least in part on the values for turbine downstream temperature 96 and turbine upstream temperature 98, respectively. FIG. 7 shows the turbine downstream entrained moisture 106 values on curve 110, and the turbine upstream entrained moisture 108 values on curve 112.

Figure 8:
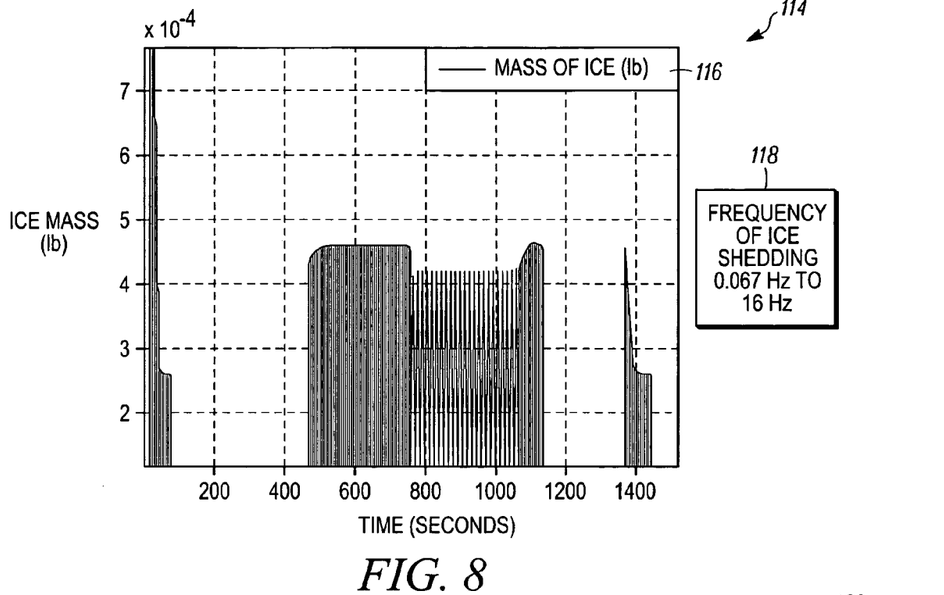
FIG. 8 depicts an illustrative graph for an application of the method of FIG. 2, namely an ice formation graph.

FIG. 8 depicts an ice formation graph 114, which is a graph of an amount of ice mass 116 on the turbine blades 22 versus flight time. The amount of ice mass 116 for any given point in time can be calculated based on the amount of ice formation 28 and ice shed 30 determined in step 56 of the icing prediction process 26. For example, for any particular point in time, the amount of ice mass 116 can be calculated at least in part by subtracting the amount of ice shed 30 from the amount of ice formation 28 for the turbine blades 22. As shown in FIG. 8, when graphed against flight time, the amount of ice mass 116 can be used in calculating a frequency of ice shedding 118. The amount of ice mass 116 is measured in pounds in FIG. 8; however, it will be appreciated that this and/or other variables can be measured in any number of different types of units. As shown, the frequency of ice shedding 118 in this particular example ranged from 0.067 Hz to 16 Hz.

FIGS. 9-12 depict an extension of the application of FIGS. 6-8, in which a time lag is introduced to the model. A time lag can be useful, for example, in incorporating effects of thermal dynamics upstream of the ACM 10. For example, certain aircraft operating data 32 and/or turbine conditions data 36 may have a delayed effect on the ACM 10 or the turbine blades 22 thereof, which can be more accurately represented by a model incorporating a time lag.

Figure 9:
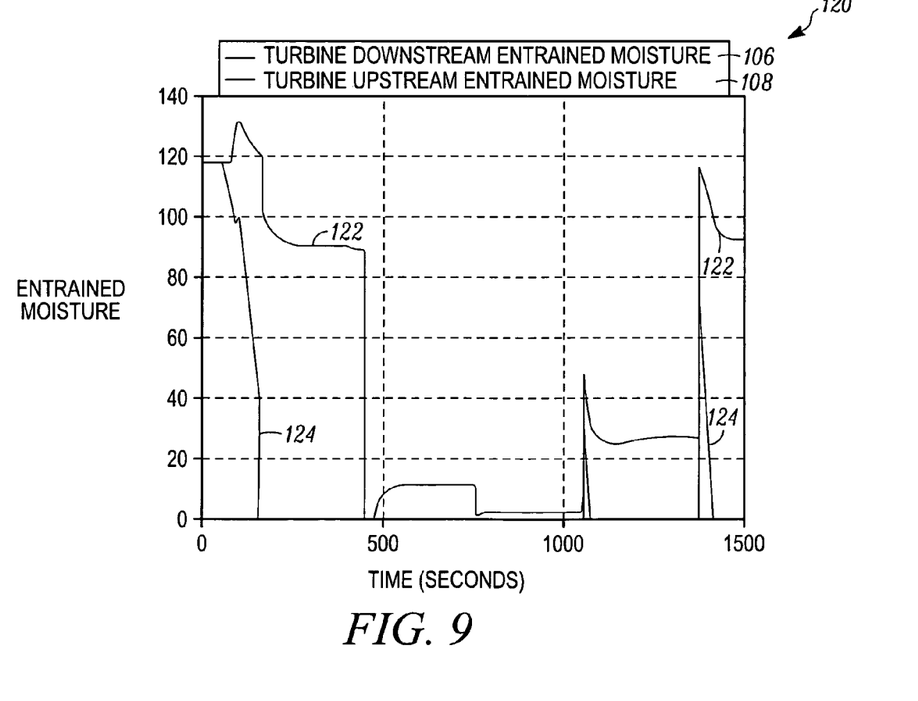
FIG. 9 depicts an illustrative graph for an application of the method of FIG. 2, namely a first order lag turbine entrained moisture graph.

FIG. 9 depicts, for illustrative purposes, a first order lag (FOL) turbine entrained moisture graph 120. As with the turbine entrained moisture graph 104 of FIG. 7, the FOL turbine entrained moisture graph 120 also is a graph of entrained moisture 80, separated into turbine downstream entrained moisture 106 and turbine upstream entrained moisture 108, versus flight time in seconds. However, the FOL turbine entrained moisture graph 120 includes a first order lag for turbine temperature 76, with a time constant of 60 seconds. FIG. 9 shows the turbine downstream entrained moisture 106 on curve 122, and the turbine upstream entrained moisture 108 on curve 124. It will be appreciated that various other time constants, lag modeling techniques and/or other techniques can be used to simulate time-delayed effects or other dynamic conditions affecting the ACM 10, and that such techniques can be used in FIG. 9 as well as FIGS. 10-12 below, which, for illustrative purposes only, also include a first order time lag for turbine temperature 76.

Figure 10:
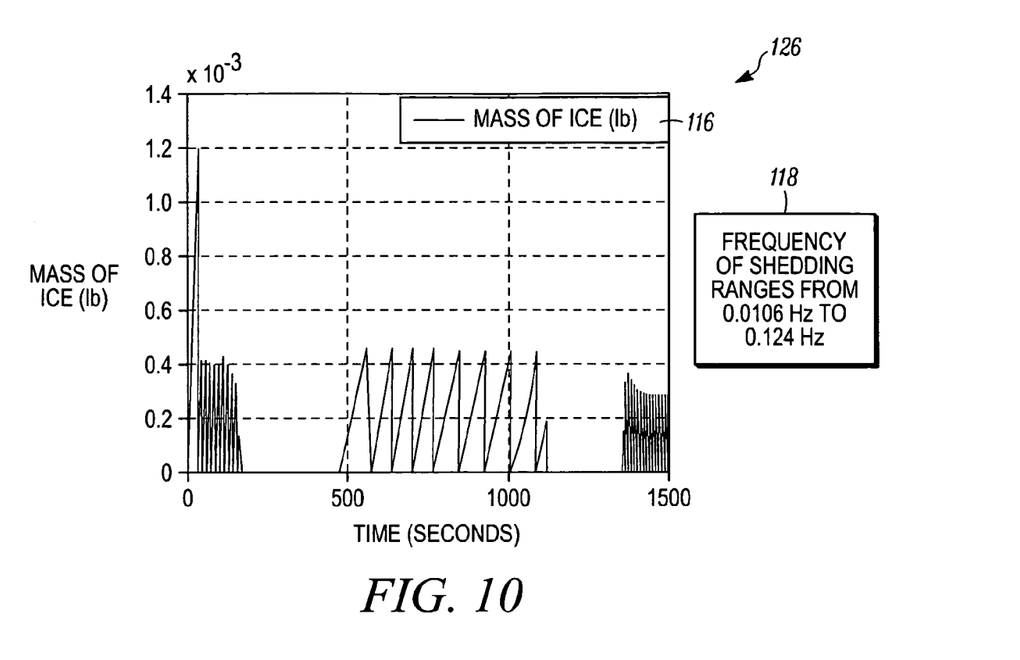
FIG. 10 depicts an illustrative graph for an application of the method of FIG. 2, namely a first order lag ice formation graph.

FIG. 10 depicts a first order lag (FOL) ice formation and shedding graph 126. As with the ice formation graph 114 of FIG. 8, the FOL ice formation graph 126 also is a graph of the amount of ice mass 116 on the turbine blades 22 versus flight time, which can be used in calculating the frequency of ice shedding 118. However, similar to FIG. 9, the FOL ice formation graph 126 of FIG. 10 also includes a first order lag for turbine temperature 76, with a time constant of 60 seconds. As shown, in this particular example the frequency of ice shedding 118 ranged from 0.0106 Hz to 0.124 Hz with the first order time lag.

Figure 11:
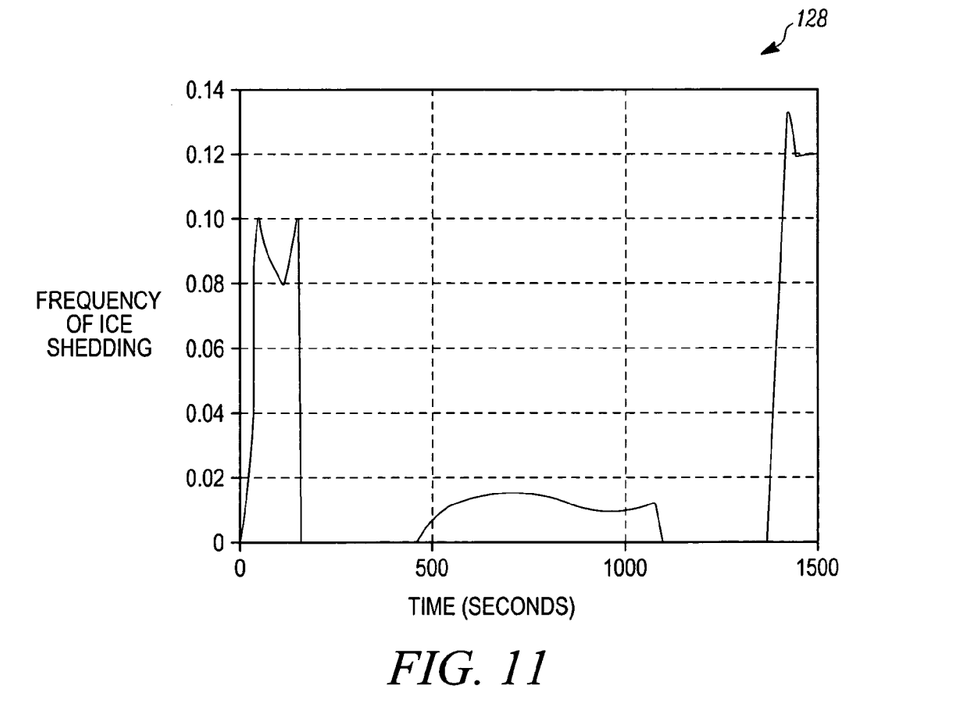
FIG. 11 depicts an illustrative graph for an application of the method of FIG. 2, namely a first order lag shedding frequency graph.

FIG. 11 depicts a first order lag (FOL) shedding frequency graph 128, which is a graph of the frequency of ice shedding 118 versus flight time in seconds, using the first order lag for turbine temperature 76 of FIGS. 9-10. The values for the frequency of ice shedding 118 depicted in FIG. 11 can be extracted from the FOL ice formation graph 126, as shown in FIGS. 10-11.

Figure 12:
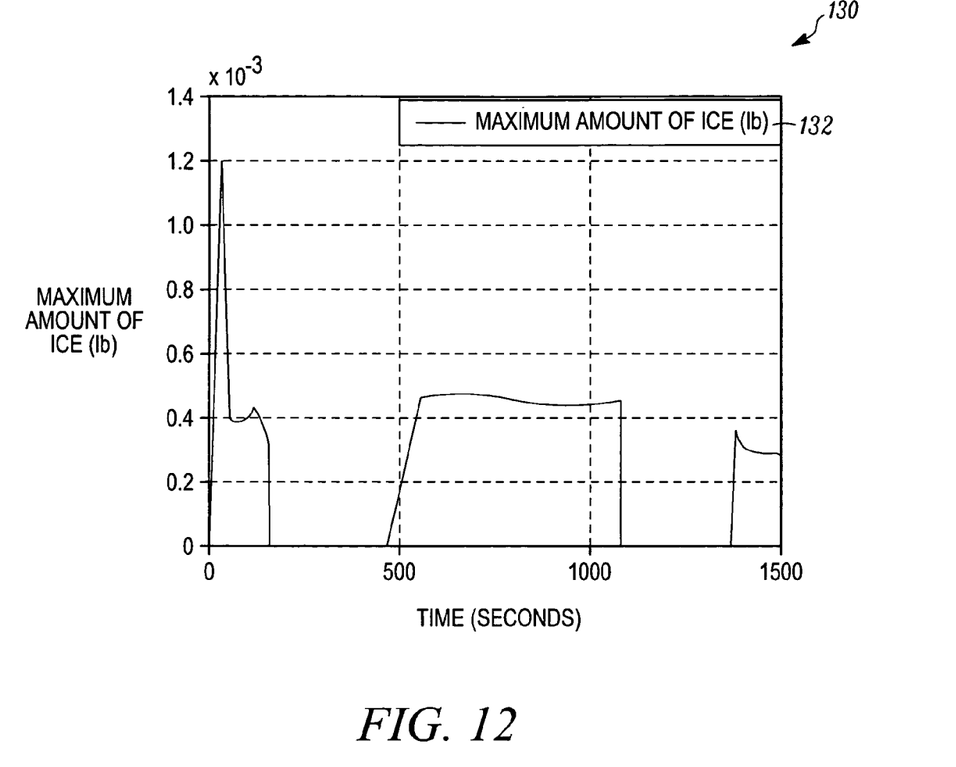
FIG. 12 depicts an illustrative graph for an application of the method of FIG. 2, namely a first order lag maximum ice graph.

Similarly, FIG. 12 depicts a first order lag (FOL) maximum ice graph 130, which is a graph of values for a maximum amount of ice 132 that can accumulate before shedding occurs versus flight time, using the first order lag for turbine temperature 76 of FIGS. 9-11 As shown, the maximum amount of ice 132 is measured in pounds in FIG. 12. However, as mentioned above, it will be appreciated that the values, as for any of the other variables, can be measured in any number of different types of units. Regardless of the units of measurement, the maximum amount of ice 132 can be calculated from the amount of ice mass 116 from the (FOL) ice formation graph 126 of FIG. 10. As with various other variables mentioned above, the maximum amount of ice 132 before shedding can also serve as a valuable tool, for example, in controlling operating conditions of the ACM 10 so as to control the amount of ice shed 30 from the ACM turbine blades 22, among various other potential applications.

Figure 13:
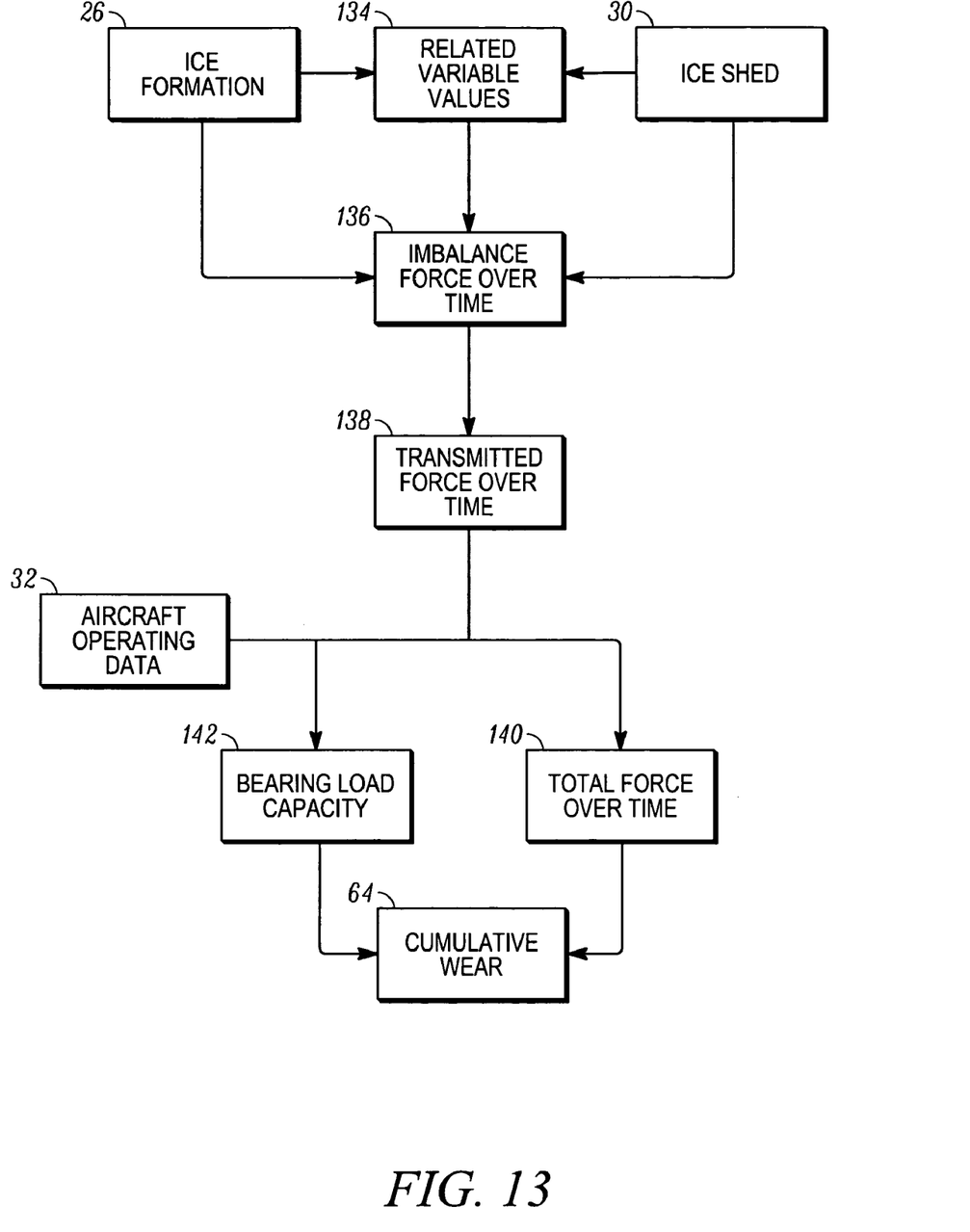
FIG. 13 depicts an additional application of the method of claim 2 with respect to calculation of an amount of cumulative wear for an ACM.

Turning now to FIG. 13, another application of the icing prediction process 26 is shown. In the particular embodiment depicted in FIG. 13, the amount of cumulative wear 64 for the ACM 10 can be determined through various calculations based at least in part on the amount of ice formation 28 and ice shed 30, and/or various related variable values 134, such as those depicted in FIGS. 6-12 above. First, an amount of imbalance force (over time) 136 can be calculated based on the values for the amount of ice formation 28 and ice shed 30, and/or from related variable values 134 such as the amount of ice mass 116, the frequency of ice shedding 118, and the maximum amount of ice 132. The amount of imbalance force 136 can in turn be used to calculate an amount of transmitted force (over time) 138 to the journal bearings 24. The amount of transmitted force 138 can in turn be used, alone or in conjunction with the aircraft operating data 32 and/or other variables, to determine an amount of total force (over time) 140 to the journal bearings 24. In addition, a bearing load capacity 142 for the journal bearings 24 can be calculated from the aircraft operating data 32 and/or other variables. Finally, the amount of cumulative wear 64 for the ACM 10 can be calculated at least in part from the total force 140 and the bearing load capacity 142 for the journal bearings 24. As mentioned above, FIG. 13 shows one application of the icing prediction process 26 for illustrative purposes only. It will be appreciated that the amount of cumulative wear 64 can be calculated using any one of numerous techniques using the results of the icing prediction process 26, and it will further be appreciated that the icing prediction process 26 may have numerous different applications.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for predicting ice formation on and shedding from blades of an air cycle machine ("ACM") turbine for an aircraft, the method comprising the steps of:
   (a) generating operational condition data representative of ACM turbine operating conditions using a software model of the ACM, the software model of the ACM configured to simulate operating conditions of the ACM turbine using operating conditions of the aircraft;
   (b) determining an amount of ice formation on the blades of the ACM turbine, using the generated operational condition data; and
   (c) determining an amount of ice shed from the blades of the ACM turbine, using the determined amount of ice formation and the generated operational condition data.

2. The method of claim 1, wherein the generated operational condition data comprises temperature, pressure, and entrained moisture of air for the ACM turbine.

3. The method of claim 1, wherein the amount of ice shed is determined using values for maximum holding stress of ice for the turbine blades.

4. The method of claim 1, further comprising:
   supplying aircraft operating data representative of aircraft environmental conditions to the software model of the ACM, to thereby generate the operational condition data.

5. The method of claim 4, wherein the aircraft operating data comprises air temperature, humidity, and altitude.

6. The method of claim 4, further comprising the steps of:
   generating a performance model configured for use in determining boundary conditions for the ACM; and
   determining boundary conditions for the software model of the ACM, using (i) the generated performance model and (ii) the generated operational condition data.

7. The method of claim 1, further comprising:
   determining the amount of ice formation and the amount of ice shed from an icing model, the icing model incorporating typical water droplet size distribution values, heat transfer parameters, and maximum holding stress values of ice for the ACM turbine blades.

8. The method of claim 7, wherein the determination of the amount of ice formation is using an assumption of uniform ice formation over the ACM turbine blades.

9. The method of claim 1, further comprising:
   determining an amount of water deposited on the ACM turbine blades, using (i) the generated operational condition data and (ii) water droplet size distribution values.

10. The method of claim 9, wherein the amount of ice formation is determined using (i) the amount of water deposited on the ACM turbine blades and (ii) heat transfer parameters.

11. A method for predicting wear to an aircraft air cycle machine ("ACM") for an aircraft from ice shedding on ACM turbine blades, the method comprising the steps of:
   (a) generating operational condition data representative of ACM turbine operating conditions using a software model of the ACM, the software model of the ACM configured to simulate operating conditions of the ACM turbine using operating conditions of the aircraft;
   (b) determining an amount of ice formation on the blades of the ACM turbine, using the generated operational condition data;
   (c) determining an amount of ice shed from the blades of the ACM turbine, using the determined amount of ice formation and the generated operational condition data; and
   (d) determining an amount of wear of the ACM, using the amount of ice formed on and shed from the blades of the ACM turbine.

12. The method of claim 11, wherein the ACM includes one or more journal bearings, and wherein the determined amount of wear is representative of wear for the ACM journal bearings.

13. The method of claim 11, further comprising:
   generating historical operational condition data representing different sets of generated operational condition data for a particular ACM turbine over a period of time; and
   determining a cumulative amount of wear for the ACM, based on the generated historical operational condition data.

14. The method of claim 11, wherein the generated operational condition data comprises temperature, pressure, and entrained moisture of air for the ACM turbine.

15. The method of claim 11, further comprising:
   supplying aircraft operating data representative of aircraft environmental conditions to the software model of the ACM, to thereby generate the operational condition data.

16. The method of claim 11, further comprising:
   determining the amount of ice formation and the amount of ice shed from an icing model, the icing model incorporating typical water droplet size distribution values, heat transfer parameters, and maximum holding stress values of ice for the ACM turbine blades.

17. The method of claim 16, wherein the determination of the amount of ice formation is using an assumption of uniform ice formation over the ACM turbine blades.

18. A system for predicting ice formation and shedding on turbine blades of an aircraft air cycle machine ("ACM") for an aircraft, the system comprising:
   (a) means for generating operational condition data representative of ACM turbine operating conditions using a software model of the ACM, the software model of the ACM configured to simulate operating conditions of the ACM turbine using operating conditions of the aircraft;
   (b) means for determining an amount of ice formation on the blades of the ACM turbine, using the generated operational condition data; and
   (c) means for determining an amount of ice shed from the blades of the ACM turbine, using the determined amount of ice formation and the generated operational condition data.

19. The system of claim 18, further comprising:
   means for supplying aircraft operating data representative of aircraft environmental conditions to the software model of the ACM, to thereby generate the operational condition data.

20. The system of claim 18, further comprising:
   means for determining an amount of wear for the ACM, using the amount of ice shed from the blades of the ACM turbine.

* * * * *